T. C. WHITE.
Grape-Picker.

No. 224,975. Patented Feb. 24, 1880.

WITNESSES
Frank A. Brooks

INVENTOR
Truman C. White
By Dewey & Co.
Atty

UNITED STATES PATENT OFFICE.

TRUMAN C. WHITE, OF FRESNO, CALIFORNIA.

GRAPE-PICKER.

SPECIFICATION forming part of Letters Patent No. 224,975, dated February 24, 1880.

Application filed July 30, 1879.

*To all whom it may concern:*

Be it known that I, TRUMAN C. WHITE, of the town and county of Fresno, and State of California, have invented a Grape-Picker; and I hereby declare the following to be a full, clear, and exact description thereof.

My invention relates to an improvement in grape-pickers; and my improvements consist in the peculiar construction of a small implement, which may be fitted to the finger, and carrying a small knife, by which the stems may be cut, and the hand be used for handling the cluster at the same time, as is more fully described in the accompanying drawings.

Figure 1:
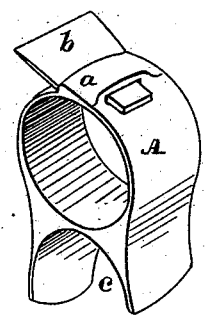
Figure 2:

Figure 1 is a view of my invention. Fig. 2 shows its application.

In picking grapes in large vineyards, where they are gathered in quantities, it is customary to carry in one hand a knife with which to cut the stems, and the bunch of grapes is gathered in the other hand.

The implement which I have devised leaves both hands free for gathering, while at the same time the knife is applied to cutting the stem.

A metal ring, A, is formed of a size to fit the forefinger of the hand, on the front portion of which is a shoulder, a, into which is fitted a cutting-blade or knife, b, as shown. The second finger of the hand finds a place in the half-ring c, which prevents the implement from turning on the first finger.

When in position on the finger the knife-blade projects upward, and by catching the stem of the bunch between the thumb and forefinger, and then moving the hand slightly, the blade will cut the stem, leaving the cluster in the hand. The grapes themselves need not be touched, the stem only being handled; or the stem may be caught between the edge of the blade and the thumb, and cut in that way, if preferred.

The cutting-blade may be secured to the shoulder of the ring in any desired way, so as to be easily removed for sharpening.

This implement does away with the necessity of having to carry a knife in the hand, and one can cut and hold the cluster with the same hand, while the foliage may be parted or held back by the other.

The device is easily made and kept in order, and will be found of great convenience.

The thumb may be protected by a piece of leather, if desired.

I am aware that implements to fit on the fingers and provided with blades to cut the stems of grapes and other fruits have heretofore been made, and hence I do not lay any claim, broadly, to such a device; but,

Having thus described my invention, what I claim as new, and desire to secure by Letters Patent, is—

The ring A, carrying the cutting-blade b and provided with the supplemental half-ring or steadying device c, the whole being worn on the forefinger and designed for cutting the stems of bunches of grapes by the same hand which gathers the bunches, substantially as herein described.

In witness whereof I have hereunto set my hand.

TRUMAN C. WHITE.

Witnesses:
CHAS. G. YALE,
FRANK A. BROOKS.